United States Patent
Fong et al.

(10) Patent No.: US 7,114,943 B1
(45) Date of Patent: Oct. 3, 2006

(54) POST PROCESSOR FOR THREE-DIMENSIONAL OBJECTS

(75) Inventors: Jon Jody Fong, Calabasas, CA (US); Raymond M. Soliz, Santa Clarita, CA (US)

(73) Assignee: 3D Systems, Inc., Valencia, CA (US)

( * ) Notice: Subject to any disclaimer, the term of this patent is extended or adjusted under 35 U.S.C. 154(b) by 0 days.

(21) Appl. No.: 11/126,892

(22) Filed: May 11, 2005

(51) Int. Cl.
*B28B 17/00* (2006.01)
*B29C 35/00* (2006.01)

(52) U.S. Cl. .................. 425/375; 425/174.4; 425/215; 425/445; 425/446; 264/401; 264/308

(58) Field of Classification Search ............ 425/174.4, 425/215, 445, 446; 264/401, 308; 134/90, 134/96.1, 98.1, 99.1
See application file for complete search history.

(56) References Cited

U.S. PATENT DOCUMENTS

| | | | |
|---|---|---|---|
| 5,136,515 A | | 8/1992 | Helinski |
| 5,141,680 A | | 8/1992 | Almquist et al. |
| 5,143,663 A | * | 9/1992 | Leyden et al. ............... 264/401 |
| 5,193,560 A | * | 3/1993 | Tanaka et al. ............ 134/56 R |
| 5,368,053 A | * | 11/1994 | Wilson ....................... 134/95.2 |
| 5,997,795 A | | 12/1999 | Danforth et al. |
| 6,259,962 B1 | | 7/2001 | Gothait |
| 6,752,948 B1 | | 6/2004 | Newell et al. |

FOREIGN PATENT DOCUMENTS

| | | |
|---|---|---|
| WO | WO 97/11837 | 4/1997 |
| WO | WO 01/26023 | 4/2001 |

* cited by examiner

*Primary Examiner*—Joseph S. Del Sole
*Assistant Examiner*—Maria Veronica Ewald
(74) *Attorney, Agent, or Firm*—Ralph D'Alessandro; Paul F. Pedigo; Summa, Allan & Additon, P.A.

(57) ABSTRACT

A post processing apparatus for automated removal of support material from a three-dimensional objected formed from a build material by selective deposition modeling is provided. The apparatus includes a heated main chamber into which is placed the three-dimensional object with the support material attached and first and second liquid heat transfer medium storage reservoirs. The storage reservoirs reversibly provide liquid heat transfer medium to the main chamber to immerse the three-dimensional object and the attached support material for desired periods of time to meltingly separate the support material from the object.

9 Claims, 3 Drawing Sheets

POST PROCESSOR FOR THREE-DIMENSIONAL OBJECTS

BACKGROUND OF THE INVENTION

1. Field of the Invention

The invention relates in general to solid deposition modeling, and in particular to an apparatus for post processing three-dimensional objects produced by such a modeling technique to remove a non-curable phase change support material from a three-dimensional object formed from a curable phase change build material.

2. Description of the Prior Art

During the past two decades several new technologies have been developed for the rapid creation of models, prototypes, and parts for limited run manufacturing. These new technologies are generally called Solid Freeform Fabrication techniques, and are herein referred to as "SFF". SFF techniques include stereolithography, selective deposition modeling, laminated object manufacturing, selective phase area deposition, multi-phase jet solidification, ballistic particle manufacturing, fused deposition modeling, particle deposition, laser sintering, and the like. Complex parts are produced using SFF techniques from a modeling material in an additive fashion, as opposed to conventional fabrication techniques that are generally subtractive in nature. For example, in most conventional fabrication techniques material is removed by machining operations or shaped in a die or mold to near net shape and then trimmed. In contrast, additive fabrication techniques incrementally add portions of a build material to targeted locations, layer by layer, in order to build a complex part. SFF technologies typically utilize a computer graphic representation of a part and a supply of a building material to fabricate the part in successive layers. SFF technologies have many advantages over conventional manufacturing methods. For instance, SFF technologies dramatically shorten the time to develop prototype parts and can produce limited numbers of parts in rapid manufacturing processes. They also eliminate the need for complex tooling and machining associated with conventional subtractive manufacturing methods, including the need to create molds for custom applications. In addition, customized objects can be directly produced from computer graphic data in SFF techniques.

Structures are formed in a layer by layer manner by solidifying or curing successive layers of a build material in most SFF techniques. For example, in stereolithography a tightly focused beam of energy, typically in the ultraviolet radiation band, is scanned across a layer of a liquid photopolymer resin to selectively cure the resin to form a structure. In Selective Deposition Modeling, herein referred to as "SDM" a phase change build material is jetted or dropped in discrete droplets, or extruded through a nozzle, to solidify on contact with a build platform or previous layer of solidified material in order to build up a three-dimensional object in a layerwise fashion. Solid object imaging, solid object modeling, deposition modeling, multi-jet modeling, three-dimensional printing and thermal stereolithography have at various time been used synonymously for SDM. Often, a thermoplastic material having a low-melting point is used as the solid modeling material, which is delivered through a jetting system such as an extruder or print head.

There has developed recently an interest in utilizing curable phase change materials in SDM. One of the first suggestions of using a radiation curable build material in SDM is found in U.S. Pat. No. 5,136,515 to Helinski, in which it is proposed to selectively dispense a UV curable build material in a SDM system. Some of the first UV curable material formulations proposed for use in SDM systems are found in Appendix A of International Patent Publication No. WO 97/11837, where three reactive material compositions are provided. More recent teachings of using curable materials in three-dimensional printing are found in U.S. Pat. No. 6,259,962 to Gothait and in International Publication Number WO 01/26023.

However, one of the most fundamental problems associated with SDM processes is the adverse effect resulting from gravitational forces that act on a part during the build process. All SDM processes must deal with gravitational forces. For example, most downward facing surfaces built by SDM processes need special supports in order to stabilize the part during the build process.

One method of supporting the three-dimensional object to counter the gravity problem is to utilize dissimilar materials in the build process. For example, two different solidifying materials can be selectively deposited in a layer-by-layer process, one material for building the part, and the other material for building the support structure. There are some generally recognized methods for removing support material from a SDM object. Three of the methods were initially proposed in U.S. Pat. No. 5,136,515 to Helinski. They include removing the support material by physical force, removing the support material by application of heat and removing the support material by chemical means. However, all methods have their drawbacks.

Where the support material is removed by physical force from a different build material, the materials can be carefully selected in order to establish a weak bond joint at their juncture such that the application of an applied force separates the support structure from the part along the joint. Where a single material is used, the point of contact between the supports and the build object can be weakened so the supports are more easily removed. However, the application of applied force to crack or crumble away the support material from the object has limitations, such as marring or damaging the three-dimensional object during support removal or breaking off entirely of delicate features. Additionally it is difficult, and sometimes impossible, to remove the support material for certain geometric configurations, such as in deep cavities or pockets.

A second separation approach is to select a support material having a lower melting point than the material of the formed object. After forming the object and support structure, the temperature of the composite is raised in order to melt out the support structure. This type of approach is described in, for example, U.S. Pat. No. 5,141,680 to Almquist et al.

A third approach uses a support material that is soluble in a solvent, but in which the different build material is not so that the support structure is dissolved away after the completed part and its support structure are submersed in the solvent. However, it is problematic with this approach that the solvent eventually becomes saturated with removed support material and must be disposed of, and then replaced with fresh solvent. Additionally, unpleasant and potentially unhealthful odors are produced by the evaporation of the solvent. Thus, implementing this approach may not be user friendly or cost effective.

None of the prior approaches provided a simple and low cost apparatus to effect reliable removal of support structure. Where the build material is an acrylate/wax based curable phase change material, there is a need to develop an apparatus capable of removing a phase change support material dispensed to support a three-dimensional object formed from a curable phase change build material without adversely affecting the three-dimensional object. These and other problems are solved by the design of the present invention.

BRIEF SUMMARY OF THE INVENTION

It is an aspect of the present invention that an automated post processing apparatus is provided to remove support material from a three-dimensional object formed by solid deposition modeling using a different build material in a heated main chamber.

It is another aspect of the present invention that the post-processing apparatus is especially well adapted to remove non-curable support material from a three-dimensional object formed from a curable build material.

It is a feature of the present invention that the post-processing apparatus employs a heated main chamber into which a molten heat transfer medium is conveyed to immerse the three-dimensional object for a desired period of time to melt and remove support material from the three-dimensional object without discoloring the object.

It is another feature of the present invention that the post-processing apparatus employs a first heated storage reservoir from which and to which molten heat transfer medium is returned from the heated main chamber.

It is another feature of the present invention that the post-processing apparatus employs a second heated storage reservoir from which and to which molten heat transfer medium is returned from the heated main chamber to accomplish a final clean melting of the support material.

It is an advantage of the present invention that the post processing apparatus is low cost and effective in removing support material from a three-dimensional object formed of a different build material without harming or damaging the object.

These and other aspects, features, and advantages are obtained in the post processing apparatus of the present invention to remove support material from an three-dimensional object formed from a different build material by selective deposition modeling by using a heated main chamber into which are pumped molten heat transfer media from separate storage reservoirs. The three-dimensional object is formed from a first heat transfer material, preferably a curable phase change composition, and the support structure is formed from a second heat transfer medium, preferably a non-curable phase change composition. The post processing apparatus stores the heat transfer medium in two heated storage reservoirs. Paraffin is a preferred heat transfer medium.

BRIEF DESCRIPTION OF THE DRAWINGS

The aspects, features, and advantages of the present invention will become apparent upon consideration of the following detailed disclosure of the invention, especially when it is taken in conjunction with the accompanying drawings wherein.

DETAILED DESCRIPTION OF THE PREFERRED EMBODIMENT

Figure 1:
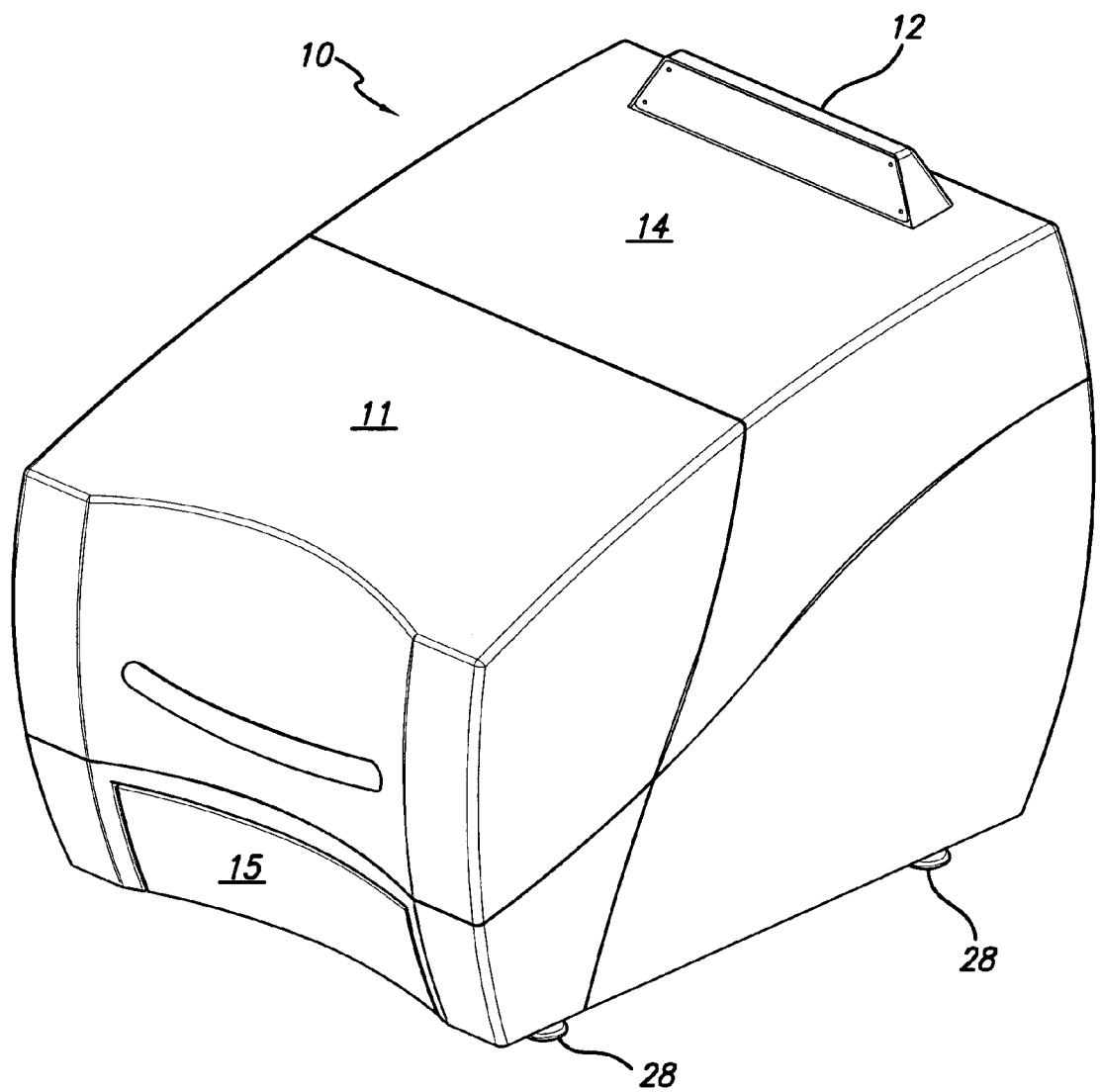
FIG. 1 is a side perspective view of the post processing apparatus of the present invention.

A post processing apparatus is indicated generally by the numeral 10 in FIG. 1. The apparatus 10 has a hinged access cover 11 over a main chamber 16, see briefly FIG. 2, and a removable access panel 16 to the first and second storage reservoirs 19 and 20, again see briefly FIG. 2. A control panel 12 is mounted to panel 14 and provides digital temperature displays and process cycle pads (not shown) to monitor and control the support material removal process from three-dimensional objects positioned within the main chamber 16. An overflow and waste collection receptacle 15 is removably mounted to the apparatus 10. Apparatus 10 is mounted on a base frame 26, best seen in FIGS. 2 and 3, and base supports or legs 28.

Figure 2:
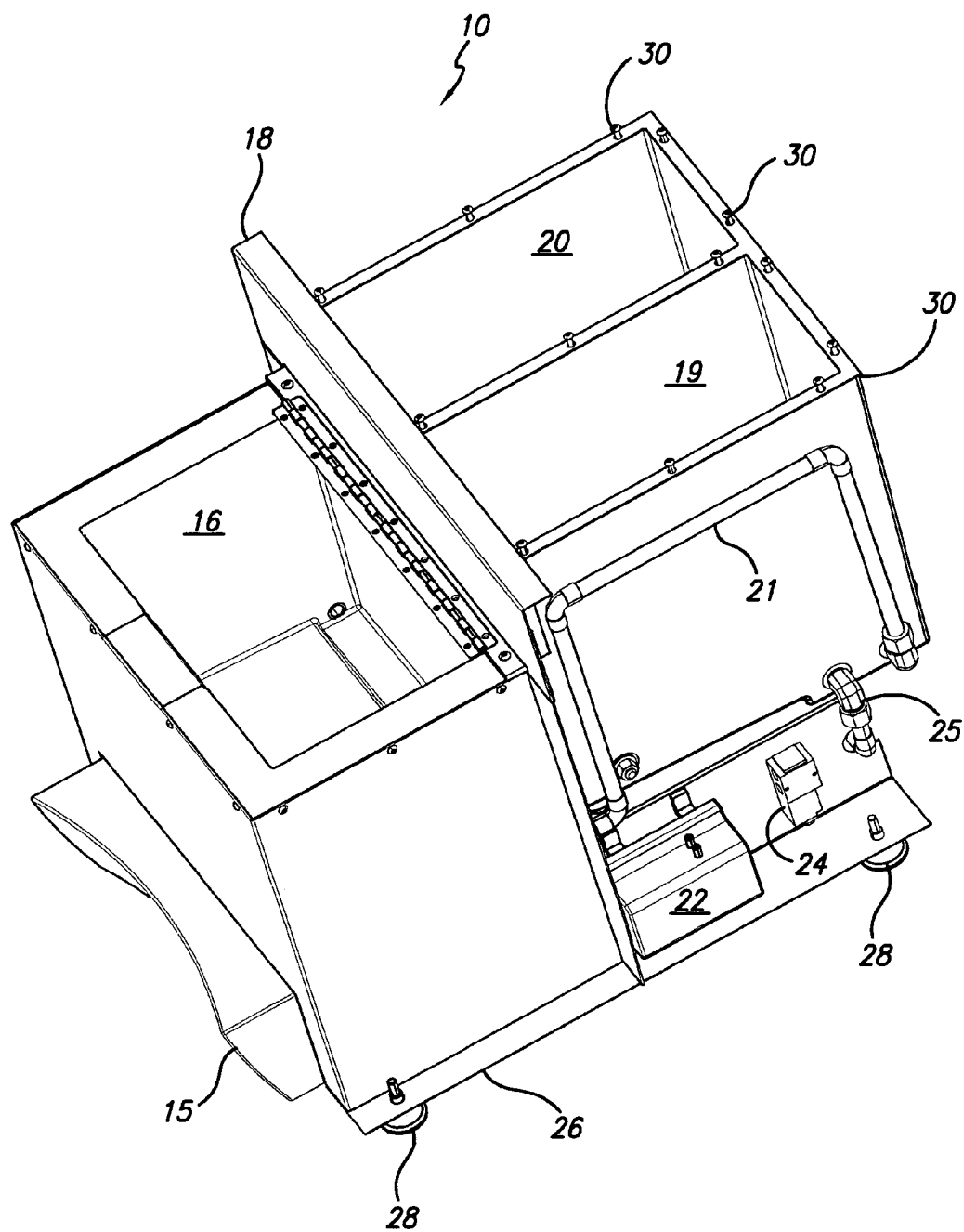
FIG. 2 is a top perspective view of the post processing apparatus of the present invention with the external covers removed, the main chamber cover raised and the tops of the storage reservoirs removed.
Figure 3:
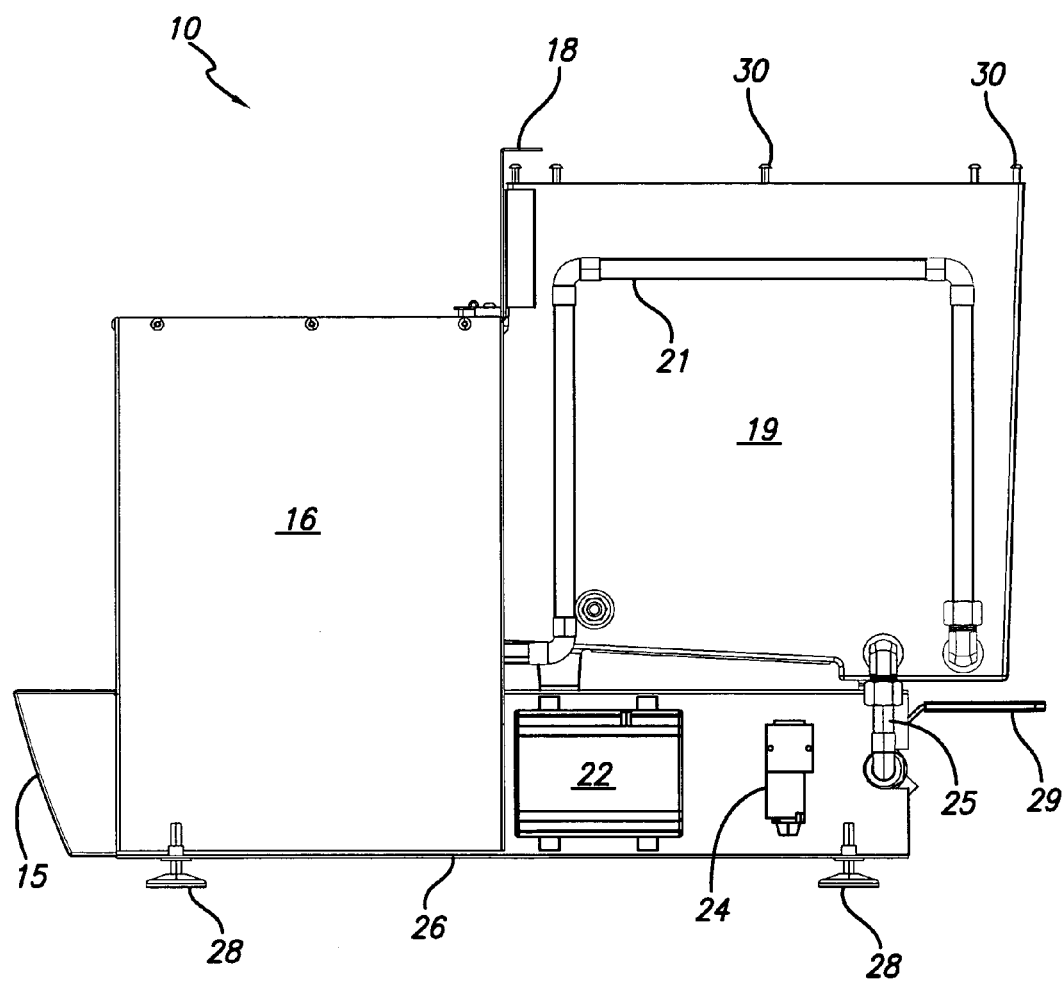
FIG. 3 is a side elevational view of the post processing apparatus of the present invention with the covers removed.

As seen in FIG. 2 the main chamber 16 has a hinged cover 18 that serves to retain heat in the chamber 16 during the support material removal process and permit easy access to the chamber. The chamber 16 is formed from aluminum and is heated with blanket type of heaters (not shown). Chamber 16 can have a rack or basket to retain three-dimensional objects being processed for removal of support material. The support material is removed by immersing the objects in chamber 16 in a liquid heat transfer medium, which preferably is molten paraffin wax.

The heat transfer medium is fed into the chamber 16 from storage reservoirs 19 and 20 via appropriate feed lines. Storage reservoirs 19 and 20 are also formed from aluminum and heated with blanket type of heaters (also not shown). Each reservoir holds sufficient liquid heat transfer medium to completely fill the chamber 16. Pipe 21 is the connection from first storage reservoir 19 to chamber 16. A pressure and vacuum pump 22 forces air into the first reservoir 19 via a solenoid valve (not shown). The pump 22 bubbles air into the closed and sealed reservoir 19 to force the heated liquid heat transfer medium into the chamber 16 to a level that totally immerses any objects within the chamber 16. A temperature measurement device 24, such as a resistance thermal device or RTD, is mounted to the storage reservoir 19 and provides sensings of the temperature of the liquid heat transfer medium within the storage reservoir 19. A controller linked to control panel 12 utilizes a proportional integral derivative function algorithm to control the temperatures in the chamber 16 and the storage reservoirs 19 and 20. A drain line 25 is shown exiting the bottom of storage reservoir 19 to permit the reservoir to be drained of support material contaminated heat transfer medium that loses its effectiveness after a period of time because of the increase in concentration of support material in it. The drain line is opened by a manually activated valve 29 in the rear of the apparatus 10, best seen in FIG. 3. This arrangement of piping, valving, pump and temperature measurement device is mirrored on second storage reservoir 20. The tops to first and second storage reservoirs 19 and 20 have been removed in FIGS. 2 and 3, but are sealingly secured by appropriate fasteners, such as screws 30, arrayed about the top of the reservoirs.

Build chamber 16 has an overflow tube (not shown) connecting to the overflow and waste receptacle 15 to allow excess liquid in the main chamber 16 to passively drain into receptacle 15. The level of liquid in the chamber 16 will rise as more parts are immersed and the support material melted off, leading to an increase over time in the liquid level when the first storage reservoir 19 pumps its contents into the chamber 16. Receptacle 15 optimally has a monitoring device to detect when it is full and needs to be emptied of solidified material, as well as an electromechanical interlock to prevent the drawer from being opened during the support material removal process.

The immersion process is selectable for a desired length of time from preset cycles that vary in length from as little as 30 minutes to as long as 2 hours or more. The length of time needed to remove the support material is dependent upon the size and the complexity of the three-dimensional objects being cleaned. After liquid heat transfer medium has been pumped into chamber 16 and the three-dimensional object immersed for the desired period of time, the pump 22 is reversed and a vacuum is drawn in the first reservoir 19, causing the liquid heat transfer medium with the now melted support material to be forced back into the storage reservoir. Then the liquid heat transfer medium in storage reservoir 20 is pumped into the chamber 16 to immerse the three-dimensional object a second time in what is considered a final cleansing bath or "rinse" with relatively uncontaminated heat transfer medium since the bulk of the support material has been removed in the first immersion by the liquid heat transfer medium from the first storage reservoir 19. When the preset time has been completed, the pump for second storage reservoir 20 is reversed and the liquid heat transfer medium is forced back into reservoir 20 in the same manner as accomplished with first storage reservoir 19. The manually activated drain valve 29 at the rear of apparatus 10 is switched from first storage reservoir 19 to second storage reservoir 20 as needed to drain the contaminated liquid heat transfer medium from each and permit replacement with fresh heat transfer medum.

A typical build material is described in detail in U.S. Pat. No. 6,841,589 entitled "Ultra-Violet Light Curable Hot Melt Composition", which is assigned to the assignee of the present invention. A typical support material is described in detail in pending application U.S. Ser. No. 10/186,447 filed Jul. 2, 2002 and published as Publication 2003/0100658 A1 and also assigned to the assignee of the present invention. The materials preferably have a melting point from about 45° C. to about 65° C., a freezing point from about 33° C. to about 60° C., and a jetting viscosity of about 10 to about 16 centipoise at the dispensing temperature. A preferred temperature for the liquid heat transfer medium during the support removal process is about 70° Centigrade.

In operation the apparatus 10 is turned on and the heaters begin to heat the storage reservoirs 19 and 20 to raise the temperature of the heat transfer medium to the operating temperature. The controller using the proportional integral derivative function algorithm maintains the temperature in the storage reservoirs 19 and 20 throughout the support material removal process. A prompt alerts the operator to inspect the waste and overflow receptacle to remove any hardened material deposited therein from previous use. An electromechanical interlock can be used to verify this has been performed. Once the storage reservoirs and their liquid heat transfer medium have been heated to the operating temperature, the operator raises cover 11, places the three-dimensional object or objects within the main chamber 16, closes the cover 11, and selects the pre-set cycle according to the size and complexity of the part. The pump 22 is activated and bubbles in air into the first storage reservoir 19, thereby positively displacing the heated liquid heat transfer medium from the reservoir 19 into the chamber 16 to immerse the part. Chamber 16 has been heated to maintain the correct temperature of the liquid heat transfer medium. The three-dimensional object is immersed for the desired pre-set time. Any excess liquid material in the chamber 16 drains into the overflow and waste collection receptacle 15. The pump 22 is reversed and the liquid heat transfer medium with the now melted support material is drawn back into the first storage reservoir 19. The liquid heat transfer medium in the second reservoir is then pumped in the chamber 16 in the same manner and immerses the object for the pre-selected and desired length of time in a final or cleansing immersion of the object. At the conclusion of the selected time, the pump is reversed and the liquid transfer medium is drawn back into the second storage reservoir 20 and the object is ready for removal and final cleaning, as necessary. Optionally, heated air can be directed into the chamber 16 at this time to further remove any residual support material. At the conclusion of the support material removal process, the post processing apparatus 10 is put into a sleep mode by its controller, allowing the temperatures in the chamber 16 and the storage reservoirs 19 and 20 to drop.

Although paraffin wax is the preferred liquid heat transfer medium, other media such as organic oil or mineral oil may be employed in the post processing apparatus 10. One organic oil that has been used with mixed success is peanut oil. Another potentially suitable liquid heat transfer medium is water.

While the present invention is applicable to removing support material from any SDM created three-dimensional objects, the invention has been described with respect to three-dimensional objects created utilizing an ink jet print head dispensing a ultraviolet radiation curable phase change material. However, it is to be appreciated that the present invention can be implemented to remove support material from three-dimensional objects created by any SDM technique utilizing a wide variety of curable phase change materials. For example, the curable phase change material can be cured by exposure to actinic radiation having wavelengths other than in the ultraviolet band of the spectrum, or by subjecting the material to thermal heat.

While the invention has been described above with references to specific embodiments thereof, it is apparent that many changes, modifications and variations in the materials, arrangements of parts and steps can be made without departing from the inventive concept disclosed herein. For example, although the post processor has been shown and described as using only molten paraffin wax to remove the support material, it is also possible to blow warm air into the main chamber to achieve supplemental melting of any residual wax after the primary immersion, or the secondary immersion. Accordingly, the spirit and broad scope of the appended claims are intended to embrace all such changes, modifications and variations that may occur to one of skill in the art upon a reading of the disclosure. All patent applications, patents and other publications cited herein are incorporated by reference in their entirety.

What is claimed is:

1. A post processing apparatus to remove support material from a three-dimensional object formed from a build material by solid deposition modeling, the support material having a lower melting point than the build material, the apparatus comprising in combination:
   (a) a selectively heated main chamber for holding the three-dimensional part and the support material attached thereto and for receiving a liquid heat transfer medium;
   (b) a selectively heated first storage reservoir for heating the liquid heat transfer medium to a temperature above the melting point of the support material and for storing a first quantity of the liquid heat transfer medium;
   (c) a first transfer pump to convey the first quantity of liquid transfer medium from the first storage reservoir to the main chamber and to convey the first quantity of liquid heat transfer medium from the main chamber to the first storage reservoir;

(d) a selectively heated second storage reservoir for heating the liquid heat transfer medium to a temperature above the melting point of the support material and for storing a second quantity of the liquid heat transfer medium;

(e) a second transfer pump to convey the second quantity of liquid transfer medium from the second storage reservoir to the main chamber and to convey the second quantity of liquid transfer medium from the main chamber to the second storage reservoir; and (f) a temperature control device to measure and maintain the temperature of the main chamber and the first and second storage reservoirs.

2. The apparatus according to claim 1 further comprising a controller to control at least one heating cycle of a desired duration.

3. The apparatus according to claim 2 wherein the controller controls a plurality of heating cycles each of different duration.

4. The apparatus according to claim 2 further comprising a collection receptacle for liquid transfer medium in fluid flow communication with the main chamber to receive melted support material and liquid heat transfer medium.

5. The apparatus according to claim 4 further comprising the collection receptacle being in fluid flow communication with the first stage reservoir and the second storage reservoir to selectively receive liquid heat transfer medium.

6. The apparatus according to claim 2 further comprising the first transfer pump and the second transfer pump being pressure vacuum pumps effective to transport liquid heat transfer medium to the main chamber by air pressure and return the liquid heat transfer medium to the first storage reservoir and the second storage reservoir by vacuum force.

7. The apparatus according to claim 6 further comprising each pressure vacuum pump being cooperative with a valve effective to control the flow into and out of each of the first storage reservoir and the second storage reservoir.

8. The apparatus according to claim 2 further comprising the liquid heat transfer medium being paraffin wax.

9. The apparatus according to claim 1 further comprising a heated air source connected to the main chamber to provide heated air to melt any additional support material after immersion in the liquid heat transfer medium.

* * * * *